June 7, 1960
G. A. STEIN
2,939,761
METHOD OF PRODUCING GLASS FIBERS
Filed March 3, 1958
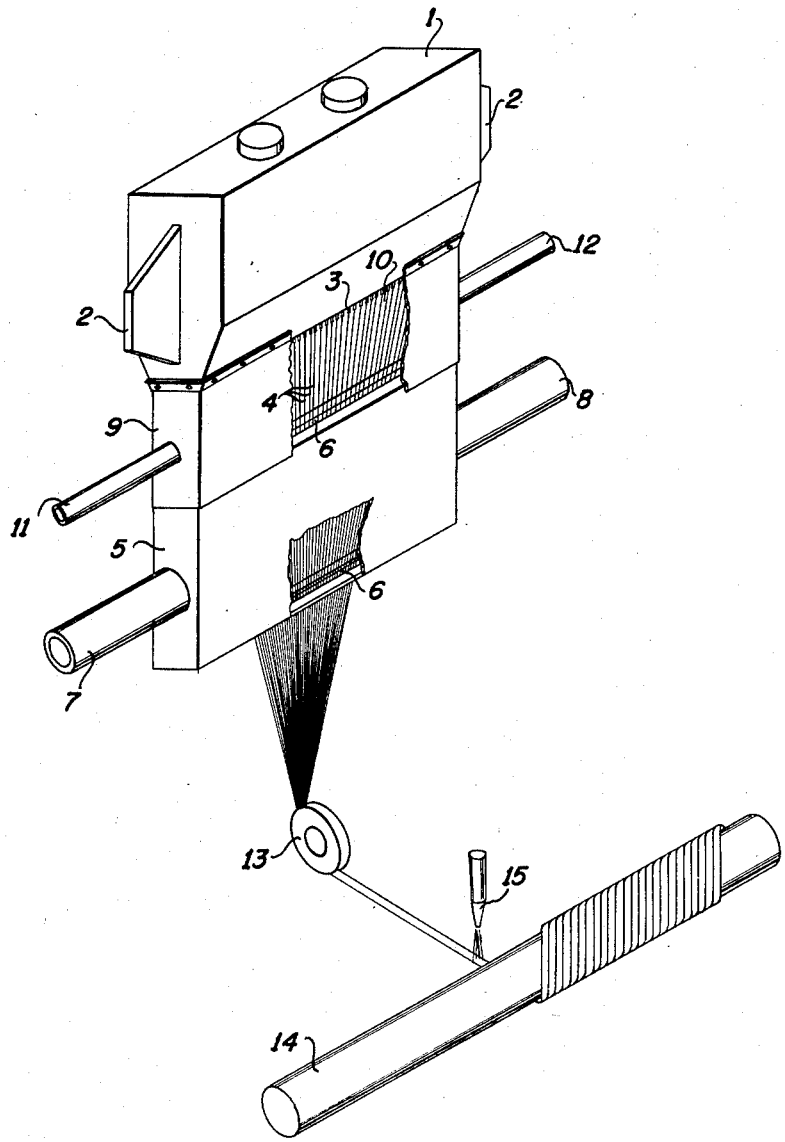
INVENTOR.
GEORGE A. STEIN
BY *Andrus + Starke*
ATTORNEYS

United States Patent Office 2,939,761
Patented June 7, 1960

2,939,761
METHOD OF PRODUCING GLASS FIBERS

George A. Stein, Menomonee Falls, Wis., assignor to A. O. Smith Corporation, Milwaukee, Wis., a corporation of New York Filed Mar. 3, 1958, Ser. No. 718,860

11 Claims. (Cl. 18—54)

This invention relates to a method of producing glass fiber reinforced resin articles and more particularly to the treatment of the glass fibers with an active fluoride compound prior to incorporating the fibers in the thermosetting resin matrix.

Glass fibers are widely used as reinforcement for thermosetting resins due to the high tensile strength which is inherent in the glass. The present invention is directed to a method of producing glass fiber reinforced articles wherein the fibers are treated immediately after drawing with an active fluoride compound to form a fluoride complex on the surface of the fibers. The treated fibers are then incorporated in a resin matrix and the fluoride complex serves as a catalyst for the polymerization of the resin.

As the fluoride compound is applied to each individual fiber, the resulting fluoride complex is uniformly distributed on each individual fiber and serves to bring about a more complete conversion of the resin.

As the modulus of elasticity between resin and glass is substantially different, a stress concentration will develop at the interface between the resin and the glass in a conventional laminated product. However, by the use of the fluoride complex of the invention, a more gradual change of the modulus of elasticity at the interface occurs which results in a decreased stress concentration at this zone when the article is subjected to stress in service.

Other objects and advantages of the invention will appear in the course of the following description.

The drawing illustrates the best mode presently contemplated of carrying out the invention.

The drawing is a schematic representation of an apparatus for drawing glass fibers and winding the fibers into a tubular article.

In the drawing, glass beads or marbles are introduced into the upper end of a metal bushing or crucible 1 and an electric current is applied to the bushing through terminals 2 to heat the glass and melt the same. The molten glass is then drawn from a plurality of orifices 3 which are located in the bottom surface of the bushing 1.

After being drawn from the bushing, the fibers 4 are passed through a closed container 5 which contains an active fluoride compound. The container 5 is provided with slots 6 in the upper and lower surfaces thereof to permit the passage of the fibers through the container.

The fluoride compound in the form of a gas is introduced into the casing through an inlet tube 7 provided in one end thereof and is withdrawn from the casing through outlet tube 8.

To prevent contamination of the glass fibers in the area between the bushing and the container 5, a shield or envelope 9 is connected between the bushing and the container 5 and defines a closed chamber 10 into which an inert gas is introduced.

The inert gas may be nitrogen, argon, helium, or any other gas which will not react with the glass fibers and which is substantially free of moisture and water vapor. The inert gas serves to prevent the highly reactive glass surface from reacting with or attracting outside materials which may contaminate the glass surface.

The inert gas is introduced into the chamber 10 through an inlet conduit 11 and is withdrawn from the chamber through outlet conduit 12.

After passing through the container 5, the fibers 4 are collected in the form of a strand by a guide wheel 13. The guide wheel 13 also serves as a means to apply other lubricating or sizing materials to the fibers, if desired.

The glass strand is then wound on a generally cylindrical mandel 14 in a helical or circumferential pattern to form the tubular article, such as a pipe. As shown in the drawing, the mandrel is advanced longitudinally and rotated to wind the strand in the helical pattern. However, any desired method of mandrel and fiber movement may be employed for the winding operation to produce superimposed layers of helical fibers. The fiber strand is impregnated with a liquid thermosetting resin by any conventional means, such as dipping, spraying, brushing, or the like. As shown in the drawing, the resin is applied to the strand by a nozzle 15.

After the desired number of layers of fibers are built up on the mandrel to provide the necessary wall thickness for the pipe, the resin is cured, generally by the application of heat, to form a hard, rigid article. The fluoride complex on the fibers functions as a catalyst for the resin to increase the degree of polymerization. After curing, the mandrel is removed from within the pipe.

Alternately, the resin coated strand may be wound on a storage reel and stored for subsequent use in a laminated article rather than being wound directly on the mandrel 14.

It may also be desirable to employ a second zone of inert gas, similar to chamber 10, between the container 5 and the location of the resin application to prevent the fluoride complex on the glass surface from reacting with or attracting materials in the atmosphere to thereby contaminate or otherwise adversely affect the catalytic properties of the fluoride complex.

The fluoride compound which reacts with the fibers may be any active or unstable fluoride compound and either a liquid or gas at temperatures in the range of 60° F. to 2000° F. Examples of fluoride compounds which may be employed are boron fluoride, aluminum fluoride, ethyl fluoride, hydrogen fluoride and the like.

It is essential to the invention that the fluoride compound be free of water or moisture. If the fluoride compound contains water, a hydroxy compound is formed on the glass fiber surface which will be water soluble. If a glass fiber having a hydroxy compound on its surface is incorporated with resin and subjected to the action of hot water in service, the hydroxy compound will dissolve, thereby destroying the bond between the glass fiber and the resin matrix. In view of this, it is essential that the fluoride compound be moisture and water free. If it is desired to dilute the concentration of the fluoride compound, an inert material, such as nitrogen or air, can be mixed with the fluoride compound if it is a gas. If a liquid fluoride compound is employed, the liquid can be diluted with a material, such as benzene or toluene, which is substantially inert with respect to both the glass and the fluoride compound.

The concentration of the fluoride compound is adjusted with respect to the speed of the glass fibers being drawn so that the fluoride complex is built up on the surface of the fibers but no etching or degradation of the fibers will occur.

By use of the present invention, the fluoride complex is uniformly distributed over each individual fiber, and the fluoride complex serves to increase the degree of conversion or polymerization of the resin. In addition, the fluoride complex reduces the stress concentration at the interface between the glass fibers and the resin. As the modulus of elasticity of the resin is substantially different from that of glass, a sharp change in modulus generally occurs at the interface between the resin and glass. However, with the use of the present invention and the fluoride complex, the sharp change in the modulus of elasticity is reduced and a gradual change in modulus occurs at the interface between the resin and glass. This substantially decreases the stress concentration at the interface and produces a sounder and stronger laminated article.

The resin to be employed in the laminated article may be any of the conventional thermosetting resins and preferably the condensation type resins, such as epoxide resins, phenolics or the like. In regard to epoxy resins, the epoxy resin may be the reaction product of bisphenol A and epichlorohydrin; the reaction product of bisphenol F and epichlorohydrin; phenol glycidyl ether; allyl glycidyl ether; epoxides produced by direct oxidation of olefins by per-acetic acid, and the like.

The present invention provides a very simple and inexpensive means for improving the bond between glass fibers and a condensation type resin matrix. The active fluoride compound reacts with the glass fiber to produce a fluoride complex on the fiber surface which serves to increase the conversion or polymerization of the resin. The resins employed may or may not contain additional catalysts or curing agents. In some cases, the fluoride complex may be employed alone without additional catalysts or curing agents, or the fluoride complex can be used in combination with other materials depending on the specific resin used and the particular fluoride complex.

Various modes of carrying out the invention are contemplated as being within the scope of the following claims particularly pointing out and distinctly claiming the subject matter which is regarded as the invention.

I claim:

1. A method of producing glass fibers to be employed as reinforcement in resin materials, comprising drawing a fiber from the molten mass of glass, reacting an active fluoride compound with the fiber with the fluoride compound being substantially free of moisture and water to provide a fluoride complex on the glass surface capable of serving as a catalyst for resins subsequently applied to said fiber, and regulating the speed of drawing said fiber with respect to the concentration of said fluoride compound to prevent etching and degradation of the fiber.

2. A method of producing glass fibers to be employed as reinforcement in a thermosetting resin article, comprising drawing a plurality of fibers from a mass of molten glass, and subjecting each individual fiber to the influence of an active fluoride compound to form a fluoride complex on the glass fiber surface, said fluoride compound being substantially free of moisture and water and having a concentration sufficient to establish said fluoride complex on the glass surface but insufficient to cause etching or degradation of the fibers.

3. A method of producing glass fibers to be employed as reinforcement in a thermosetting resin article, comprising drawing a plurality of fibers from a mass of molten glass, subjecting each individual fiber to the influence of an active fluoride compound to form a fluoride complex on the glass fiber surface, said fluoride compound being substantially free of moisture and water, and adjusting the concentration of said fluoride compound with respect to the speed of drawing to establish the fluoride complex on the glass surface and prevent etching and degradation of the fibers.

4. A method of producing a glass reinforced resin article, comprising drawing a glass fiber from a mass of molten glass, reacting the glass fiber with an active fluoride compound to form a fluoride complex on the outer surface of the glass fiber, said fluoride compound being selected from the group consisting of boron fluoride, hydrogen fluoride, aluminum fluoride and ethyl fluoride and being substantially free of moisture and water, and regulating the speed of drawing said fiber with respect to the concentration of said fluoride compound to establish the fluoride complex on the glass surface and prevent etching and degradation of the fiber, and incorporating the fluoride treated glass fiber with a resin matrix with said fluoride complex serving as a catalyst for the resin to increase the degree of polymerization of the same.

5. A method of producing a fiber glass reinforced resin article, comprising drawing a plurality of fibers from a mass of molten glass, subjecting each individual fiber to the influence of an active fluoride compound substantially free of moisture and water to form a fluoride complex on the outer surface of each fiber, and regulating the speed of drawing of said fibers with respect to the concentration of said fluoride compound to establish said fluoride complex on the surface of the fiber and prevent etching and degradation thereof, collecting said treated fibers into a strand, winding said strand on a generally cylindrical mandrel to form a tubular article, impregnating said strand with a liquid uncured thermosetting resin, and curing the resin to form a rigid article with said fluoride complex serving as a catalyst to increase the rate of polymerization of said resin.

6. A method of producing a fiber glass reinforced resin article, comprising drawing a plurality of fibers from a mass of molten glass, subjecting each individual fiber to the influence of an active fluoride compound substantially free of moisture and water to form a fluoride complex on the outer surface of each fiber, continually maintaining the glass fibers in a substantially inert atmosphere from the time of drawing until said fibers are subjected to the influence of said fluoride compound, coating said treated fibers with a liquid uncured resin to prevent surface activity of said fluoride complex, forming the resin coated fibers into an article, and curing the resin to form a rigid article with said fluoride complex serving as a catalyst to increase the degree of polymerization of said resin.

7. The method of claim 6 in which the fluoride compound is selected from the group consisting of boron fluoride, hydrogen fluoride, aluminum fluoride and ethyl fluoride.

8. A method of producing a glass reinforced resin article, comprising drawing a glass fiber from a mass of molten glass, reacting the glass fiber with a gaseous material to form a fluoride complex on the outer surface of the fiber, said material being substantially moisture and water free and consisting essentially of a mixture of a gaseous active fluoride compound and a generally inert gaseous diluent, controlling the speed of drawing of the glass fiber with respect to the concentration of said material to prevent etching and degradation of the fiber, coating the treated fiber with a liquid uncured resin, and curing the resin with said fluoride complex serving as a catalyst to increase the degree of polymerization of said resin.

9. A method of producing a glass reinforced resin article, comprising drawing a glass fiber from a mass of molten glass, reacting the glass fiber with a material to form a fluoride complex on the outer surface of the fiber, said material being substantially moisture and water free and consisting essentially of a mixture of a liquid fluoride compound and a liquid diluent with said diluent being substantially inert with respect to both glass and said fluoride compound, coating the treated fiber with a liquid uncured resin, and curing the resin with said fluoride complex serving as a catalyst to increase the degree of polymerization of said resin.

10. A method of producing a glass reinforced resin article, comprising the steps of passing molten glass through a plurality of openings in a bushing to form a plurality of individual fibers, reacting the fibers with a water and moisture free fluoride compound to form a fluoride complex on the outer surface of the fibers, wrapping the fibers circumferentially upon the peripheral surface of an elongated mandrel while rotating the mandrel at a speed commensurate with the size of fibers being drawn, applying an unpolymerized thermosetting resin to said fibers, and curing the resin with said fluoride complex serving as a catalyst for the resin to increase the degree of polymerization of the same.

11. A method of producing a fiber glass reinforced resin article, comprising drawing a plurality of fibers from a mass of molten glass, subjecting each individual fiber to the influence of an active fluoride compound substantially free of moisture and water to form a fluoride complex on the outer surface of each fiber, continually maintaining the glass fibers in a substantially inert atmosphere from the time of drawing until said fibers are subjected to the influence of said fluoride compound, coating said treated fibers with an uncured resin, and continually maintaining the glass fibers in a substantially inert atmosphere from the time said fibers are subjected to the influence of said fluoride compound until said fibers are coated with said resin to prevent surface activity of said treated fibers.

References Cited in the file of this patent

UNITED STATES PATENTS

| | | |
|---|---|---|
| 2,331,944 | Von Pazsiczky et al. | Oct. 19, 1943 |
| 2,699,415 | Nachtman | Jan. 11, 1955 |

FOREIGN PATENTS

| | | |
|---|---|---|
| 849,842 | France | Aug. 28, 1939 |